Figures 1, 2:
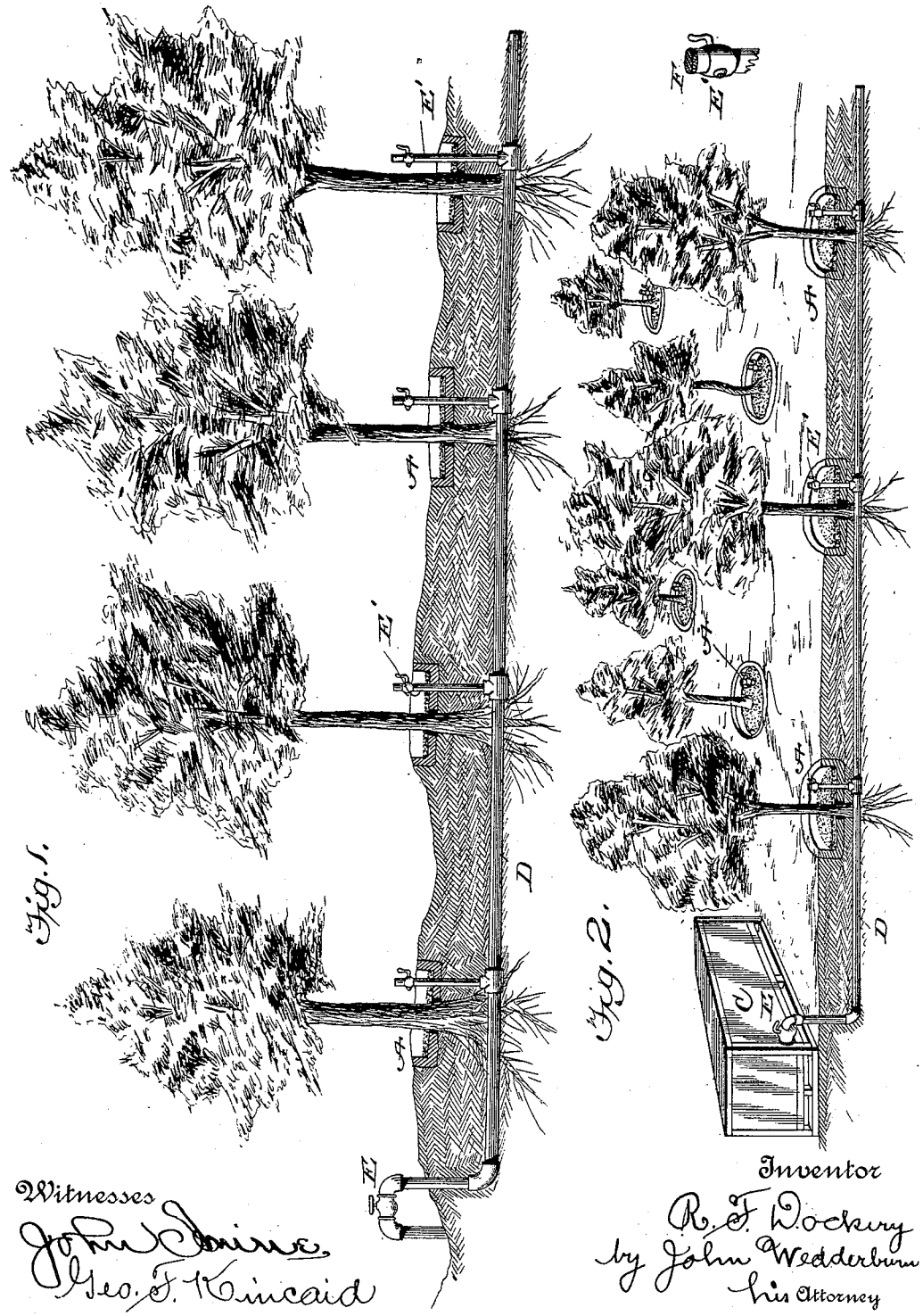

(No Model.)

R. F. DOCKERY.
APPARATUS FOR IRRIGATING.

No. 499,524. Patented June 13, 1893.

Witnesses
Inventor
R. F. Dockery
by John Wedderburn
his Attorney

UNITED STATES PATENT OFFICE.

ROBERT F. DOCKERY, OF HIGHLAND PARK, CALIFORNIA.

APPARATUS FOR IRRIGATING.

SPECIFICATION forming part of Letters Patent No. 499,524, dated June 13, 1893.

Application filed August 2, 1892. Serial No. 441,975. (No model.)

*To all whom it may concern:*

Be it known that I, ROBERT F. DOCKERY, of Highland Park, in the county of Los Angeles and State of California, have invented certain new and useful Improvements in Methods of and Apparatus for Irrigation; and I do hereby declare the following to be a full, clear, and exact description of the invention, such as will enable others skilled in the art to which it appertains to make and use the same.

My invention relates to a new and useful system for irrigating land by means of underground pipes.

The object of my invention is to provide means whereby water may be conducted to each individual plant or tree in such a manner that the trees can be irrigated with the minimum exposure of water surface and consequent loss by evaporation, also with the minimum loss by the percolation of the water through places distant from the roots of the trees, and where the irrigating value of the water is wasted, and also to avoid the great and continuous labor necessary to consistently repair the irrigating ditches and basins under the present system, and my invention more particularly resides in the novel method and apparatus hereinafter fully specified and set forth in the claims.

In the accompanying drawings, Figure 1 is a vertical section showing the method of irrigating each individual plant or tree on uneven ground. Fig. 2 is a perspective view of the system.

In the present system of irrigation, the water is conducted by means of surface ditches to the individual trees, and it follows that under this system such ditches are liable to be destroyed in cultivating the ground, rendering necessary the construction of new ditches at each season of irrigation. Moreover great loss of water takes place by evaporation, and by percolation through the sides of the trenches. In my improved system these disadvantages are avoided, as will be seen upon an examination of my apparatus.

Around each tree I arrange a basin A which may be either circular or of any desired form, the sides of which may, if necessary, be lined with concrete, cement or other similar material. The bottom of the basin I cover with a layer of clean sand which serves the purpose of preventing baking and evaporation, stopping the growth of weeds around the trees, and also rendering the basin more durable. The water is supplied to the basin A from a main flume or reservoir C by means of underground pipes D which open into the basins, and the supply of water from the main flume C to the pipes D is regulated by means of plugs or faucets E. Extending upward through the bottom of the basin A are pipes F, the top of said pipes being on a water level and connecting at their lower ends with the pipe D. These pipes may be made of cement or any suitable material. In order to protect the pipes from being clogged with dirt which might enter through the openings, I provide at each opening a metallic screen G. It will be seen by this arrangement that each tree will receive exactly the same amount of water.

Having thus fully described my invention, what I claim, and desire to secure by Letters Patent, is—

1. In apparatus for irrigating trees the combination of a basin surrounding the tree, with underground pipes having a mouth opening in the basin above the bottom thereof, and a faucet or stop-cock near said mouth, and said mouth being on a water level, substantially as described.

2. In apparatus for irrigating trees the combination of basins surrounding the individual trees, a head water-supply, and underground pipes leading therefrom and an opening in each basin above the bottom thereof, said openings being on a water level, substantially as described.

In testimony whereof I have signed this specification in the presence of two subscribing witnesses.

ROBERT F. DOCKERY.

Witnesses:
A. L. AUSTIN,
F. A. HUTCHINSON.